United States Patent [19]

Dong-Il

[11] Patent Number: 5,268,628
[45] Date of Patent: Dec. 7, 1993

[54] PHASE VOLTAGE MEASURING DEVICE OF AN AC MOTOR AND A MEASURING METHOD THEREOF

[75] Inventor: Kim Dong-Il, Seoul, Rep. of Korea

[73] Assignee: Samsung Electronics Co., Ltd., Suwon, Rep. of Korea

[21] Appl. No.: 964,064

[22] Filed: Oct. 21, 1992

[30] Foreign Application Priority Data

Oct. 21, 1991 [KR] Rep. of Korea .................. 91-18534

[51] Int. Cl.[5] .............................................. H02P 5/28
[52] U.S. Cl. ................................... 318/809; 318/767; 318/811
[58] Field of Search ............... 318/731, 732, 733, 734, 318/735, 767, 808, 809, 810, 811, 812

[56] References Cited

U.S. PATENT DOCUMENTS

| | | | |
|---|---|---|---|
| 4,703,246 | 10/1987 | Sakamoto et al. | 318/809 |
| 4,788,485 | 11/1988 | Kawagishi et al. | 318/811 |
| 4,814,677 | 3/1989 | Plunkett | 318/254 |
| 4,904,919 | 2/1990 | McNaughton | 318/798 |
| 4,926,104 | 5/1990 | King et al. | 318/599 |
| 4,954,764 | 9/1990 | Kim | 318/798 |
| 4,958,117 | 9/1990 | Kerkman et al. | 318/805 |
| 4,994,950 | 2/1991 | Gritter | 363/41 |
| 5,032,771 | 7/1991 | Kerkman et al. | 318/807 X |
| 5,159,246 | 10/1992 | Ueki | 318/254 |

FOREIGN PATENT DOCUMENTS 3-89880  4/1991  Japan .

*Primary Examiner*—Bentsu Ro
*Attorney, Agent, or Firm*—Burns, Doane, Swecker & Mathis

[57] ABSTRACT

A phase voltage measuring device for an alternating current and a measuring method thereof for detecting a voltage from a main power supply Vcc supplied to a motor, wherein the voltage is converted to a digital signal which is multiplied by a basic pulse width modulation signal for detection of the phase voltage. A phase voltage measuring device and a measuring method have the advantage of measuring a phase voltage with a simple circuit by eliminating the problems associated with a conventional phase voltage measuring device which uses a current measuring coil and a pulse converter.

4 Claims, 4 Drawing Sheets

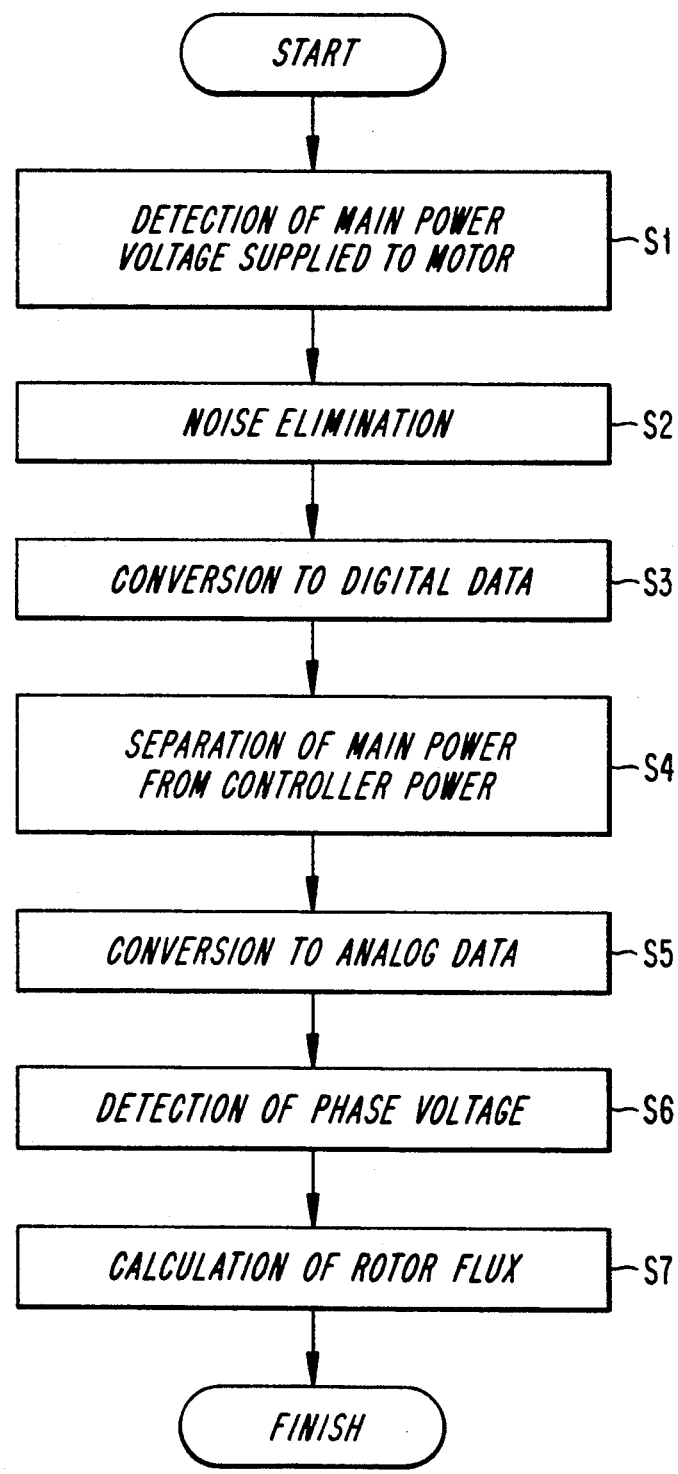

PHASE VOLTAGE MEASURING DEVICE OF AN AC MOTOR AND A MEASURING METHOD THEREOF

BACKGROUND OF THE INVENTION

1. Field of the Invention

The present invention relates to a phase voltage measuring device for an Alternating Current (AC) motor and a measuring method thereof, and more particularly to a phase voltage measuring device for an AC motor and a measuring method thereof which can measure a phase voltage being supplied to a motor rotating in the forward and reverse directions according to a control signal supplied to a base terminal of a power switching element for driving the motor.

2. Description of the Prior Art

Generally, a vector control method used for controlling an AC motor makes an AC motor possess a characteristic similar to a Direct Current (DC) motor by converting a stator current of an induction motor to an equivalent value on a rotating d-q axis. The d-axis is positioned to correspond to a flux phase of a rotor that has an equivalent value on the d-axis which is separated into a flux component current, and an equivalent value on the q-axis which is separated into a torque component current.

An AC motor thus driven by the vector control method is widely used in numerically controlled machine tools and robotic systems which call for highly efficient dynamic characteristics and accuracy. In the meantime, in order to realize vector control, an accurate detection of a rotor flux is needed. If only a detection of accurate rotor flux can be achieved, the vector control method has an invariable change of a motor parameter, thereby causing the accurate detection of the rotor flux to have considerable importance. Accordingly, a phase voltage supplied to an AC motor has to be detected in order to detect an accurate rotor flux.

A phase voltage detection device for an AC motor is disclosed in Japanese laid open patent application No. Hei:3-89880 having a control device for an AC motor. As illustrated in FIG. 1, the Japanese laid open patent comprises a plurality of circuits. A servo circuit 1 detects the difference between an objective value Wr* and the present displacement value of Wr of a motor M, and it controls a power control circuit 2 connected electrically to the motor M. A current detection circuit 3 detects currents supplied to respective phases of the motor M. A discrepancy discrimination circuit 4 discriminates discrepancies generated on the motor M according to a comparison between a detection value IR of the current detection circuit 3 and an objective current value IP of the serve circuit 1. A control signal generating circuit 5 supplies a predetermined control signal to the power control circuit 2 according to the discrimination result of the discrepancy discrimination circuit 4. The current detection circuit for detecting respective currents supplied to the motor from the control device of the AC motor as constructed in the foregoing description uses a current measuring coil and a pulse converter, resulting in a difficult installation to the motor and bulkiness.

Accordingly, the present invention takes into consideration the various aforementioned conventional problems. It is an object of the present invention to provide a phase voltage measuring device for an AC motor and a measuring method thereof, which can calculate a rotor flux based on measuring a phase voltage of an invariable motor against a rotor resistance having the most extreme variations among the parameters of the motor.

It is another object of the present invention to provide a phase voltage measuring device and a measuring method thereof, which can reduce the manufacturing cost and can simplify the construction by measuring the phase voltage of the motor in a comparatively simple circuit configuration.

SUMMARY OF THE INVENTION

In accordance with the objects of the present invention, the phase voltage measuring device is provided with various means. Pulse Width Modulation (PWM) signal generating means generate PWM signals in order to generate voltages to be supplied to respective phases of the motor. PWM signal distribution means distribute PWM signals from said PWM signal generating means. Motor driving control means provide a drive control signal for a motor with a PWM signal output from the PWM signal distribution means. Voltage detection means detect a voltage signal of a main power supply provided to the motor driving means in order to control a phase current supplied to respective phases of the motor. The motor control device has motor driving means which drive a motor according to the control signal of the motor driving control means. Noise elimination means eliminates noises included in the main power supply detected by said voltage detection means. Analog-to-Digital (A/D) converting means converts an analog signal from the noise elimination means to a digital signal. Power cut-off means cuts off the main power supply to said motor drive means by being turned on and off according to the digital signal from said A/D converting means. Multiplying Digital-to-Analog (D/A) converting means generates a phase voltage by multiplying a PWM signal from the PWM signal generating means with a digital signal from the A/D converting means.

In the meantime, a phase voltage measuring method for an AC motor in accordance with the present invention is provided with various steps. A voltage of a main power source supplied to the motor driving means is detected. Noises included in signals from the voltage detection step are eliminated. An analog signal from the noise elimination step is converted to a digital signal. A main power supply is cut off by being turned on and off in accordance with a digital signal from the conversion step. A phase voltage is detected by multiplying the digital signal from the power source cut-off step with a PWM signal from said A/D converting means.

BRIEF DESCRIPTION OF THE DRAWINGS

For fuller understanding of the nature and objects of the invention, reference should be made to the following detailed description taken in conjunction with the accompanying drawings in which:

FIG. 4 is a flow chart for illustrating the operational procedures for a phase voltage measuring method for an AC motor in accordance with the present invention.

DETAILED DESCRIPTION OF THE INVENTION

Figure 1:
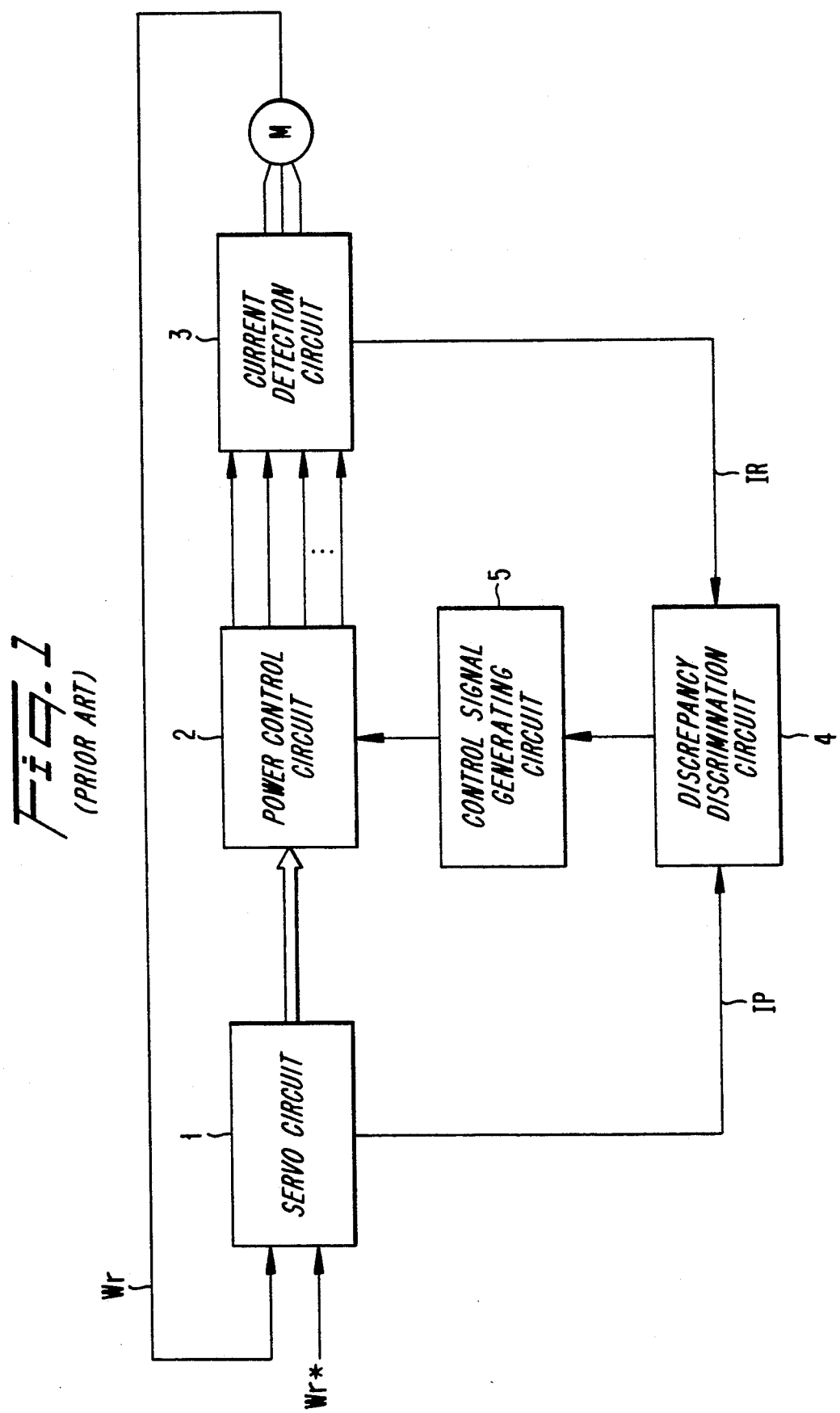
FIG. 1 is a basic block diagram for showing a schematic construction of a control device for a conventional AC motor.
Figure 2:
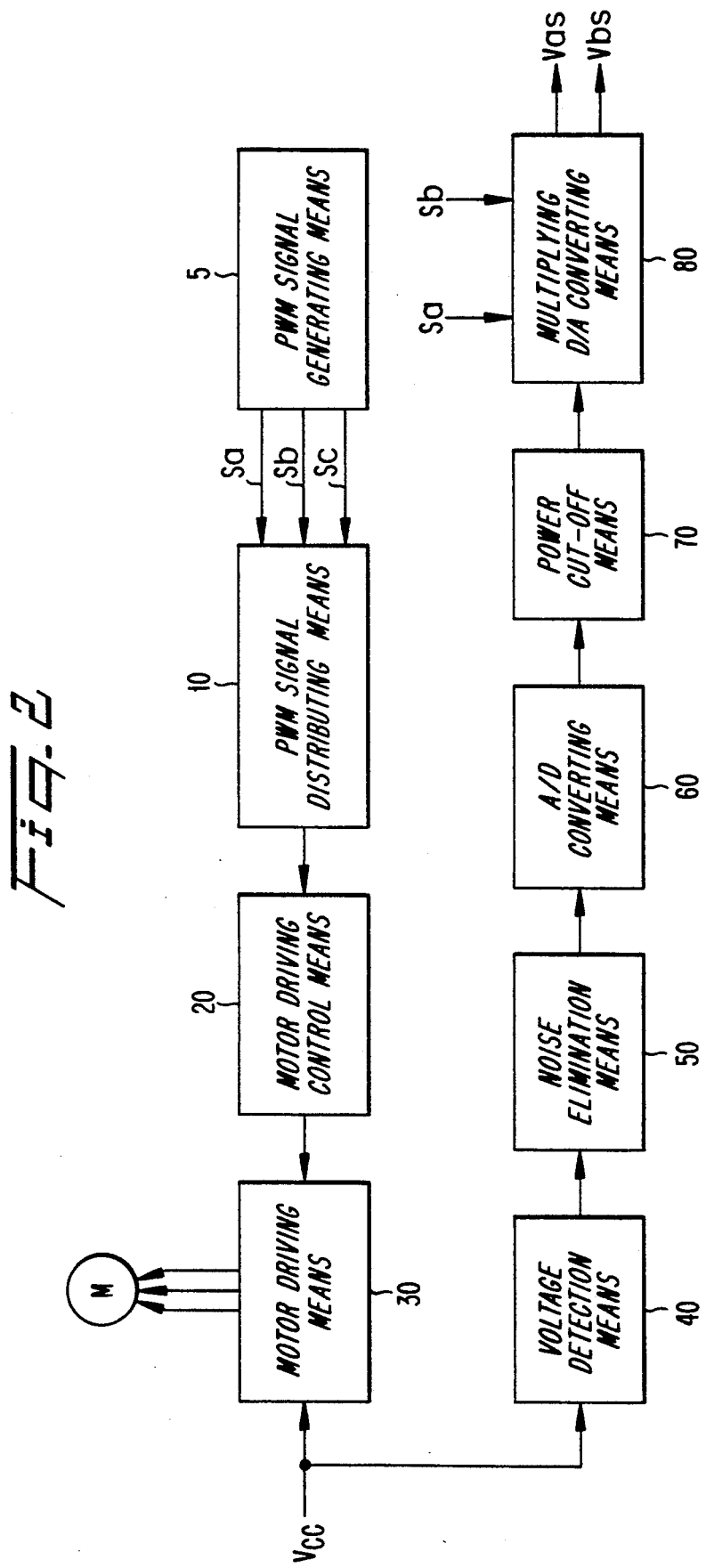
FIG. 2 is a block diagram for illustrating a phase voltage measuring device for an AC motor in accordance with an embodiment of the present invention.
Figure 3:
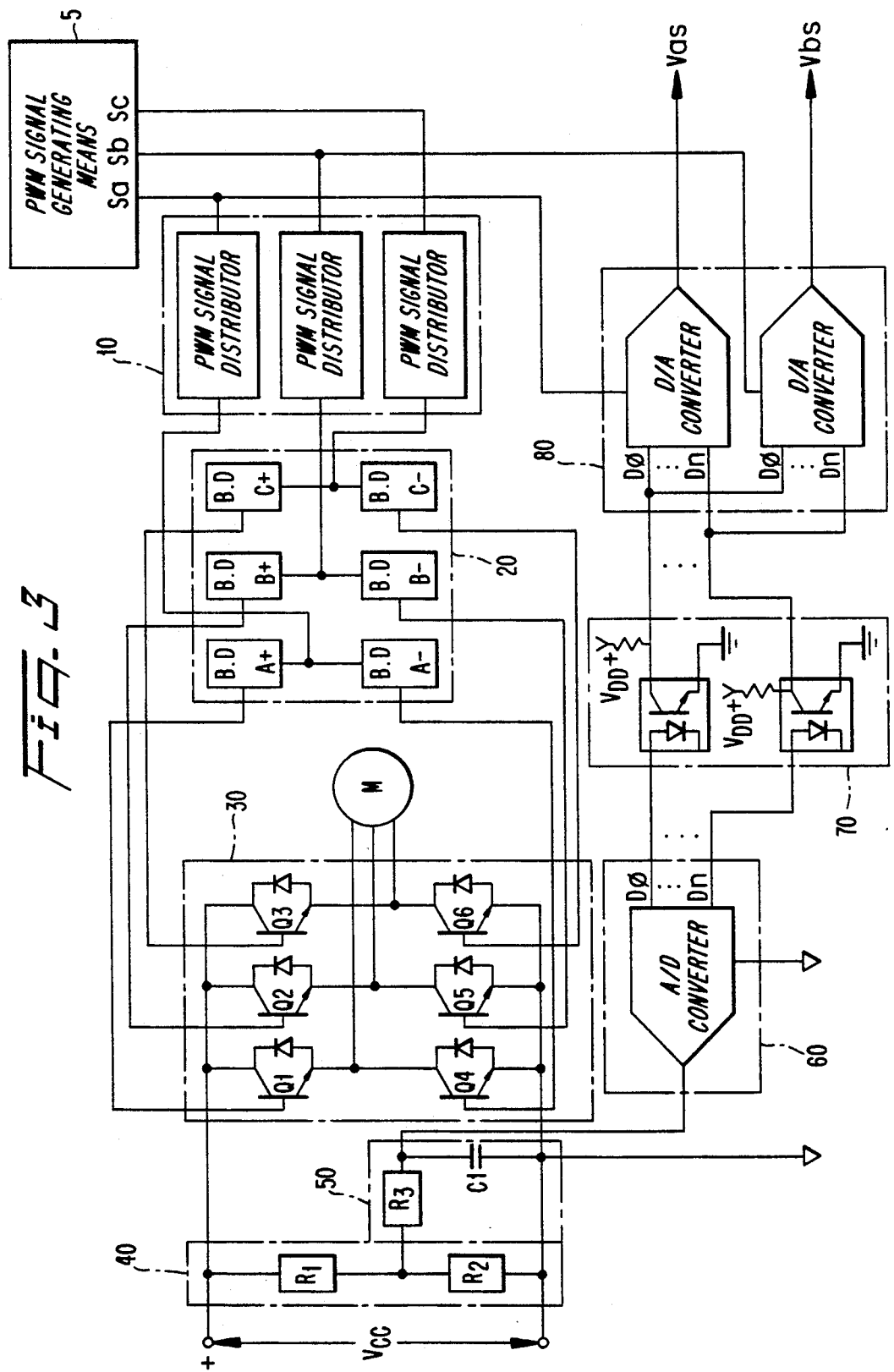
FIG. 3 is a detailed circuit diagram of a phase voltage measuring device for an AC motor in accordance with the present invention.

As illustrated in FIGS. 2 and 3, the voltage detection means 40 includes resistors R1, R2 to detect a voltage of the main power supply Vcc supplied to motor driving means 30 and simultaneously to adjust an input voltage level appropriate to the A/D converting means (to be mentioned later).

The noise elimination means 50 uses a low-pass filter consisting of a resistor R3 and a condenser C1 in order to filter noises included in the signals from the voltage detection means 40.

The A/D converting means 60 converts to digital signals the output signals in which noises are eliminated from the noise elimination means 50. The main power Vcc supplied to the motor driving means 30 is substituted by an accurate digital data value as the number of bits gets larger and larger.

Power cut-off means 70 includes photocouplers in order to protect the circuit element of a controller by cutting off the high-voltage main power Vcc supplied to the motor driving means 30 as the power cut-off means 70 turns on and turns off in accordance with the digital signals from the A/D converting means 60.

The photocouplers are respectively connected to output terminals D0-Dn of the A/D converter.

Meanwhile, PWM signal distribution means 10 is constructed to distribute a plurality of PWM signals Sa, Sb, Sc generated by PWM signal generating means 5.

The PWM signal generating means 5 is constructed to output PWM signals Sa, Sb, Sc either by comparing a triangular wave with a proportionally-integrated control value of a difference between a current command value and a current feedback value against each phase of the motor or by controlling the hysteresis of the current command value and the current feedback value.

Motor driving control means 20 supplies PWM signals from the PWM signal distribution means 10 to a base terminal of power switching elements Q1–Q6 of the motor driving means 30, thereby driving the motor with the motor driving means 30.

Multiplying D/A converting means 80 comprises two D/A converters in order to detect phase voltages Vas, Vbs of the motor by multiplying the PWM signals Sa, Sb by the outputs of the power cut-off means 70 comprising photocouplers. The data input terminals of the D/A converting means 8 are connected to the output terminals of the photocouplers.

A rotor flux detected from the phase voltage measured by the phase voltage measuring device of the AC motor constructed in accordance with the present invention can be obtained by the following formulae.

$$\phi_{xr} = \frac{a_0}{a_3} \int_0^t (V_{xs} - R_s\, i_{xs})\, dt - \frac{1}{a_3} i_{xs} \quad (1)$$

$$\phi_{yr} = \frac{a_0}{a_3} \int_0^t (V_{ys} - R_s\, i_{ys})\, dt - \frac{1}{a_3} i_{ys} \quad (2)$$

$\phi_{xr}$: X axis rotor flux
$\phi_{yr}$: Y axis rotor flux
$i_{xs}$: X axis stator current
$i_{ys}$: Y axis stator current
$V_{xs}$: X axis stator applied voltage -continued
$V_{ys}$: Y axis stator applied voltage $$a_0: \frac{1}{\sigma L_s}$$

$$a_3: \frac{a_0 M}{L_r}$$

$$\sigma: 1 - \frac{M^2}{L_s L_r} : \text{sneak coefficient}$$

$R_s$: Stator resistance
$L_s$: Stator inductance
$L_r$: rotor inductance
$M$: mutual inductance therefore $$\begin{bmatrix} V_{ys} \\ V_{xs} \end{bmatrix} = \begin{bmatrix} 1 & -\frac{1}{2} & -\frac{1}{2} \\ 0 & -\frac{\sqrt{3}}{2} & -\frac{\sqrt{3}}{2} \end{bmatrix} \begin{bmatrix} V_{as} \\ V_{bs} \\ V_{cs} \end{bmatrix} \quad (3)$$

$$\begin{bmatrix} i_{xs} \\ i_{ys} \end{bmatrix} = \begin{bmatrix} 1 & -\frac{1}{2} & -\frac{1}{2} \\ 0 & -\frac{\sqrt{3}}{2} & -\frac{\sqrt{3}}{2} \end{bmatrix} \begin{bmatrix} i_{as} \\ i_{bs} \\ i_{cs} \end{bmatrix} \quad (4)$$

Vas, Vbs, Vcs = a, b, c phase voltages on the three-phase stator axis. ias, ibs, ics = a, b, c phase currents on the three-phase stator axis.

As seen in the foregoing formulae (1) (2) (3) (4), in order to detect a rotor flux, the phase voltage supplied to the motor can be measured in accordance with the flow chart in FIG. 4.

The operation of the present invention having a construction as illustrated in FIG. 2 and FIG. 3 is depicted with reference to the flow chart of FIG. 4.

When the main power Vcc is supplied to the motor M by the motor drive control means 30 as depicted in FIG. 2 and FIG. 3, in order to measure a phase voltage supplied to the motor M, in step S1 the voltage of the main power Vcc supplied to motor drive means is detected by the voltage detection means 40. The voltage detection means 40 includes resistors R1, R2. The process then advances to step S2, and noises included in the signals from the voltage detection means 40 are eliminated utilizing the noise elimination means 50 comprising a resistor R3 and a condenser C1.

In other words, a high frequency portion having high noise is cut off by the noise elimination means 50, which, accordingly, passes only low frequencies having low noise factors.

The voltage detected from the voltage detection means 40 passes the noise elimination means 50. Since it is deprived of noises, it is input to the A/D converting means 60, and it is finally converted to a digital signal for outputting, in step S3.

The phase voltage of the motor is converted to a digital signal at the A/D converting means 60, and it drives a light emitting element of the photocoupler of power cut-off means 70 which cuts off the main power Vcc and the power Vdd of the controller, in step S4.

Then, output signals D0-Dn of a light receiving element are multiplied by the PWM signals from the PWM signal generating means 5 at the multiplying D/A converting means 80 for conversion of a digital signal to an analog signal, in step S5.

The process, thereafter, advances to step S6, wherein the outputs of the multiplying D/A converting means 80 become the phase voltage signals Vas, Vbs.

The process then advances to step S7, and the phase voltage signals Vas, Vbs are obtained from the rotor flux.

According to the phase voltage measuring device of the AC motor and the measuring method thereof as explained in the foregoing, the voltage is detected from the main power supplied to the motor, then the voltage is converted to the digital signal for driving the power cut-off means. The phase voltage is thereafter detected by multiplying the output signals by the PWM signals, which eliminates various drawbacks involved in the detection of the phase voltage utilizing a conventional current measuring coil and a pulse converter, thereby enabling the detection of the phase voltage with a simple circuit and reducing manufacturing costs.

What is claimed is:

1. A phase voltage measuring method for an alternating current motor having a motor drive means controlled by pulse width modulated signals, comprising the steps of:
   detecting the voltage of a main power supply supplied to the motor drive means;
   converting the detected voltage of the main power supply to digital values;
   cutting off the main power supply in response to the digital values; and
   generating phase voltages by multiplying the pulse width modulated signals with the digital values.

2. A phase voltage measuring device for an alternating current motor having a motor drive means comprising:
   means for generating pulse width modulation signals;
   means connected to said generating means for distributing the pulse width modulation signals;
   motor driving control means, responsive to the distributed pulse width modulated signals, for supplying pulse width modulated signals to the motor drive means of the alternating current motor;
   means for detecting the voltage of the main power supply supplied to the motor drive means;
   analog-to-digital converting means for converting the detected voltage of the main power supply to digital values;
   power cut-off means, responsive to the digital values from the analog-to-digital converting means, for cutting off the main power supply; and
   multiplying digital-to-analog converting means for generating phase voltages by multiplying the pulse width modulated signals with the digital values from the analog-to-digital converting means.

3. A phase voltage measuring device according to claim 2 which further includes noise elimination means for eliminating noises in the voltages detected in the main power supply.

4. A phase voltage measuring device according to claim 3 wherein the power cut off means includes photocouplers.

* * * * *